United States Patent

Altounyan

[15] 3,671,625
[45] June 20, 1972

[54] COMPOSITIONS FOR TREATING ASTHMA COMPRISING BIS-CHROMONYL COMPOUNDS AND METHOD OF EMPLOYING SAME

[72] Inventor: Roger Edward Collingwood Altounyan, Wilmslow, England

[73] Assignee: Fisons Pharmaceuticals Limited, Leicestershire, England

[22] Filed: March 12, 1970

[21] Appl. No.: 19,119

Related U.S. Application Data

[63] Continuation of Ser. No. 650,663, July 3, 1967, abandoned, which is a continuation of Ser. No. 536,285, March 22, 1966, abandoned.

[30] Foreign Application Priority Data

Dec. 17, 1965  Great Britain.....................53,744/65

[52] U.S. Cl...............................424/45, 424/283, 424/330
[51] Int. Cl......................................A61k 13/00, A61k 27/00
[58] Field of Search..................424/283, 330, 45; 260/345.2

[56] References Cited

UNITED STATES PATENTS 3,419,578  12/1968  Fitzmaurice et al. ................260/345.2

Primary Examiner—Albert T. Meyers
Assistant Examiner—Leonard Schenkman
Attorney—Wenderoth, Lind & Ponack

[57] ABSTRACT

Bis-chromonyl compounds of the formula:
0002

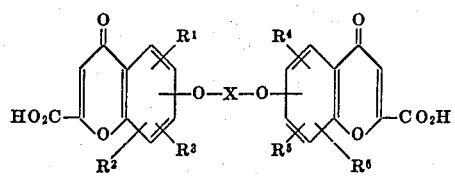

and therapeutically acceptable salts, esters and amides thereof, wherein $R^1$, $R^2$, $R^3$, $R^4$, $R^5$ and $R^6$ are the same or different and each is H or halogen, lower alkyl, hydroxy, lower alkoxy, substituted lower alkyl or substituted lower alkoxy, and X is a saturated or unsaturated, substituted or unsubstituted, straight or branched polymethylene chain which may be interrupted by one or more carbocyclic rings or oxygen-containing heterocyclic rings, oxygen atoms or carbonyl groups are particularly useful for the relief and prophylaxis of asthma when mixed with bronchodilators.

14 Claims, No Drawings

COMPOSITIONS FOR TREATING ASTHMA COMPRISING BIS-CHROMONYL COMPOUNDS AND METHOD OF EMPLOYING SAME

This application is a continuation of application Ser. No. 650,663, filed July 3, 1967, which in turn is a continuation of application Ser. No. 536,285, filed Mar. 22, 1966, both earlier applications being now abandoned.

This invention is concerned with improvements in or relating to novel pharmaceutical compositions containing chromone derivatives.

It has now been found that certain bis-chromonyl compounds are advantageously administered by inhalation in association with a bronchodilator.

According to the invention, therefore, there is provided a pharmaceutical composition comprising a bronchodilator and a bis-chromonyl compound of the formula:

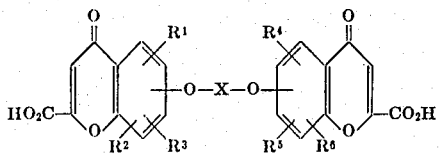

I or a functional derivative thereof, in which $R^1$, $R^2$, $R^3$, $R^4$, $R^5$ and $R^6$ are the same or are different and each is a hydrogen atom or a substituent other than hydrogen; and X is a saturated or unsaturated, substituted or unsubstituted, straight or branched polymethylene chain which may be interrupted by one or more carbocyclic rings or oxygen-containing heterocyclic rings (e.g. benzene, dioxan, tetrahydrofuran, or dihydropyran rings), oxygen atoms or carbonyl groups.

Examples of $R^1$, $R^2$, $R^3$, $R^4$, $R^5$ and $R^6$ include alkyl groups (e.g. methyl and ethyl groups); substituted alkyl groups (e.g. haloalkyl, hydroxyalkyl, alkoxyalkyl, acetoxyalkyl, carboxyalkyl, aminoalkyl, alkylaminoalkyl, dialkylaminoalkyl, hydroxylaminoalkyl and hydrazinoalkyl groups), unsaturated alkyl groups (e.g. alkenyl and alkynyl groups such as allyl and propargyl groups); aralkyl groups (e.g. benzyl and phenethyl groups); substituted aralkyl groups (e.g. haloaralkyl and alkylaralkyl groups); aryl groups (e.g. phenyl and naphthyl groups); substituted aryl groups (e.g. alkaryl, haloaryl, nitroaryl, carboxyaryl and hydroxyaryl groups); heterocyclic groups (e.g. pyridyl, furyl or pyrrolyl groups); substituted heterocyclic groups; cycloalkyl groups (e.g. cyclopentyl or cyclohexyl groups); substituted cycloalkyl groups (e.g. hydroxycycloalkyl or carboxycycloalkyl groups); nitrile groups; imino-ether groups, amidine groups; nitro groups; nitroso groups; hydroxy groups; alkoxy groups (e.g. methoxy or ethoxy groups), substituted alkoxy groups (e.g. hydroxyalkoxy, alkoxyalkoxy, carboxyalkoxy, haloalkoxy, aminoalkoxy, alkylaminoalkoxy, or dialkylaminoalkoxy groups); unsaturated alkoxy groups (i.e. alkenyloxy or alkynyloxy groups); aralkyloxy groups (e.g. a benzyloxy group); substituted aralkoxy groups; aryloxy groups (e.g. phenyloxy or naphthyloxy groups); substituted aryloxy groups, heteroyloxy groups (e.g. a pyridyloxy group); cycloalkyloxy groups (e.g. cyclohexyloxy or cyclopentyloxy groups); expoxyalkoxy groups; amino groups; alkylamino groups (e.g. ethylamino and propylamino groups); dialkylamino groups (e.g. dimethylamino and diethylamino groups); cycloalkylamino groups; arylamino groups (e.g. phenylamino and napthylamino groups); diarylamino groups (e.g. a diphenylamino group); haloalkylamino groups; alkenylamino groups; aminoalkylamino groups, amine oxide groups, oxime groups; hydroxylamino groups; azo groups, hydrazino groups; hydrazide groups; hydrazone groups; heterocyclic amino groups; imide groups; urea groups; thiourea groups, guanidine groups; thiol groups; alkyl thiol groups; substituted alkyl thiol groups; aryl thiol groups; substituted aryl thiol groups; and halogen atoms (e.g. chlorine, bromine, or iodine atoms).

Additionally, an adjacent pair of $R^1$, $R^2$ and $R^3$ together with the adjacent carbon atoms or an adjacent pair of $R^4$, $R^5$ and $R^6$, together with the adjacent carbon atoms may form a ring system, e.g. a carbocyclic ring system such as a cyclohexane, cyclopentane or benzene ring or a heterocyclic ring system such as a pyran or furan ring.

Where a pair of $R^1$, $R^2$ and $R^3$ or a pair of $R^4$, $R^5$ and $R^6$ ortho or para to each other both represent hydroxy groups, e.g. a compound of the formula:

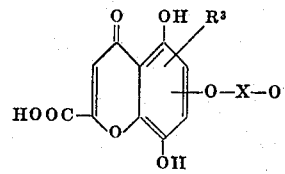

the corresponding quinone, e.g. of the formula:

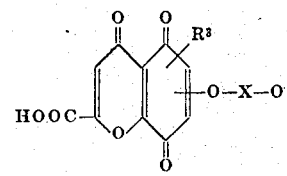

may be obtained and such compounds are also included within the scope of the invention.

A preferred pharmaceutical composition according to the invention comprises a bronchodilator and a bis-chromonyl compound of the formula:

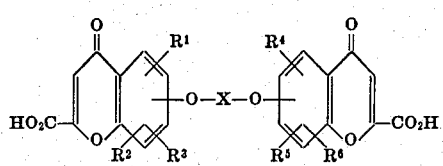

II or a functional derivative thereof, in which $R^1$, $R^2$, $R^3$, $R^4$, $R^5$ and $R^6$ are the same or are different and each is a hydrogen or halogen atom (e.g. a chlorine, bromine, iodine or fluorine atom), a lower alkyl group (e.g. a methyl, ethyl, propyl, isopropyl, butyl or tertiary butyl group) a hydroxy group, a lower alkoxy group (e.g. a methoxy, ethoxy, propoxy, isopropoxy, butoxy or tertiary butoxy group), a substituted lower alkyl group (e.g. a hydroxy lower alkyl or halo lower alkyl group such as chloro-, bromo-, fluoro- or iodo lower alkyl group), a substituted lower alkoxy group, (for example a hydroxy lower alkoxy, lower alkoxy lower alkoxy or carboxy lower alkoxy group) an unsaturated lower alkyl group (for example an allyl group), a nitro group, an amino group or a cyano group; and X is a saturated or unsaturated, substituted or unsubstituted, straight or branched polymethylene chain which may be interrupted by one or more carbocyclic rings or oxygen-containing heterocyclic rings (e.g. benzene, dioxan, tetrahydrofuran or dihydropyran rings), oxygen atoms or carbonyl groups.

Particularly preferred compositions contain bis-chromonyl compounds of Formula II above in which not more than one of $R^1$, $R^2$ and $R^3$ and not more than one of $R^4$, $R^5$ and $R^6$ is other than hydrogen.

Especially preferred compounds of Formula II above, for use in the compositions of the invention, are those in which all of $R^1$, $R^2$, $R^3$, $R^4$, $R^5$ and $R^6$ are hydrogen.

The group X, in Formula I or Formula II above, may be any of a wide variety of groups. Thus for example, it may be a straight or branched, saturated or unsaturated hydrocarbon chain. Further, X may be such a chain interrupted by one or more oxygen atoms, carbonyl groups or carbocyclic or heterocyclic rings and may be substituted by one or more halogen atoms (e.g. chlorine, bromine, fluorine or iodine atoms) or hydroxy or lower alkoxy groups (e.g. methoxy, ethoxy, propoxy, isopropoxy, butoxy, tertiary butoxy groups etc). Specific examples of the group X are groups of the formulas:

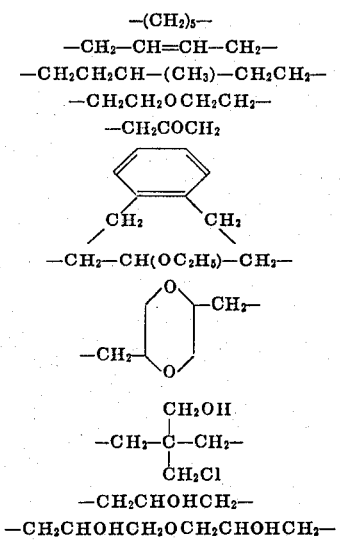

etc. The group X is preferably a straight or branched hydrocarbon chain, which may be interrupted by one or more oxygen atoms, and contains from three to seven carbon atoms. Desirably such a chain is substituted by one or more hydroxyl groups, particularly preferred chains being the 2-hydroxy-trimethylene chain (—$CH_2$.CHOH$CH_2$—) and the 3-hydroxy-pentamethylene chain. The chain —O—X—O— may link different or corresponding positions on the chromone molecules.

A particularly preferred compound of Formula II above is 1,3-bis(2-carboxychromon-5-yloxy)-2-hydroxypropane of the formula:

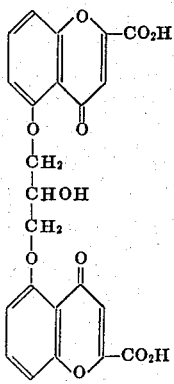

Other bis-chromonyl compounds of Formula II which may be mentioned, include:

1,5-bis(2-carboxychromon-5-yloxy)-pentane;
1,4-bis(2-carboxychromon-5-yloxy)butane;
1,4-bis(2-carboxychromon-5-yloxy)-2,3-dihydroxy-butane;
1,4-bis(2-carboxychromon-5-yloxy)-2-hydroxy-butane;
1,4-bis(2-carboxychromon-5-yloxy)-but-2-ene;
1,10-bis(2-carboxychromon-5-yloxy)-decane;
1,6-bis(2-carboxychromon-5-yloxy)-hexane;
1,3-bis(2-carboxychromon-5-yloxy)-propane;
1,5-bis(2-carboxychromon-6-yloxy)-pentane;
1,5-bis(2-carboxychromon-7-yloxy)-pentane;
1,3-bis(2-carboxychromon-7-yloxy)-2-hydroxypropane;
1,2-bis(2-carboxychromon-5-yloxymethyl)benzene;
1-(2-carboxychromon-5-yloxy)-3-(2-carboxychromon-7-yloxy)-2-hydroxypropane;
1,3-bis(2-carboxychromon-6-yloxy)-2-hydroxypropane;
1-(2-carboxychromon-5-yloxy)-3-(2-carboxy-8-ethyl-chromon-5-yloxy)-2-hydroxypropane;
1,3-bis(2-carboxychromon-5-yloxy)-chloromethyl-2-hydroxymethyl-propane;
1-(2-carboxychromon-5-yloxy)-3-(2-carboxy-6-chloro-chromon-7-yloxy)-2-hydroxypropane;
1,3-bis(2-carboxychromon-5-yloxy)-2-oxo-propane;
1,5-bis(2-carboxychromon-5-yloxy)-3-hydroxy-pentane;
1,3-bis(2-carboxychromon-5-yloxy)-2-ethoxy-propane;
1,12-bis(2-carboxychromon-5-yloxy)-2,11-dihydroxy-4,9-dioxadodecane;
1,7-bis(2-carboxychromon-5-yloxy)-2,6-dihydroxy-4-oxa-heptane;
1,5-bis(2-carboxychromon-5-yloxy)-3-oxapentane;
1,10-bis(2-carboxychromon-5-yloxy)-3,8-dioxa-4,7-diox-odecane;
1,5-bis(2-carboxy-8-chlorochromon-5-yloxy)-pentane;
1-(2-carboxychromon-5-yloxy)-5-(2-carboxychromon-7-yloxy) pentane;
1,3-bis(2-carboxy-7-methylchromon-5-yloxy)-2-hydroxypropane;
1,3-bis(2-carboxy-8-ethylchromon-5-yloxy)-2-hydroxypropane;
1,5-bis(2-carboxychromon-8-yloxy) pentane;
1,5-bis(2-carboxy-8-methylchromon-7-yloxy)-pentane;
1,3-bis(2-carboxy-8-methylchromon-7-yloxy)-2-hydroxypropane;
1,5-bis(2-carboxychromon-5-yloxy)-3-methyl-pentane;
1,3-bis(2-carboxy-6-chlorochromon-7-yloxy)-2-hydroxypropane;
1-(2-carboxychromon-5-yloxy)-3-(2-carboxychromon-6-yloxy)-2-hydroxypropane;
1-(2-carboxychromon-5-yloxy)-3-(2-carboxychromon-8-yloxy)-2-hydroxypropane;
1,8-bis(2-carboxychromon-5-yloxy)-octane;
1,9-bis(2-carboxychromon-5-yloxy)-nonane;
1,2-bis(2-carboxychromon-5-yloxy)-ethane;
2,5-bis(2-carboxychromon-5-yloxymethyl)-dioxan;
1-(8-allyl-2-carboxychromon-7-yloxy)-3-(2-carboxychromon-6-yloxy)-2-hydroxypropane;
1,5-bis-(8-allyl-2-carboxychromon-7-yloxy)-pentane;
1,3-bis(2-carboxy-8-nitrochromon-5-yloxy)-2-hydroxypropane;
1,3-bis(2-carboxy-7-methoxychromon-5-yloxy)-2-hydroxypropane;
1,5-bis(2-carboxy-7-methoxychromon-5-yloxy)-pentane;
1,3-bis-(2-carboxy-5(2-hydroxypropoxy)chromon-7-yloxy)-2-hydroxypropane;
1,3-bis-(2-carboxy-7-(2-hydroxypropoxy)-chromon-5-yloxy)-2-hydroxypropane;
1,5-bis(2-carboxy-5-methoxychromon-7-yloxy)-pentane;
1,5-bis(2-carboxy-7-methoxychromon-6-yloxy)-pentane;
1,5-bis(2-carboxy-7-(2-hydroxyproproxy)-chromon-6-yloxy-pentane;
1,3-bis(5-benzyloxy-2-carboxychromon-7-yloxy)-2-hydroxypropane;
1,3-bis(2-carboxy-5-methoxy-chromon-7-yloxy)-2-hydroxypropane;
1,3-bis(2-carboxy-5-hydroxy chromon-7-yloxy)-2-hydroxypropane;
1,3-bis(8-allyl-2-carboxychromon-5-yloxy)-2-hydroxypropane;
1,3-bis(8-allyl-2-carboxychromon-7-yloxy)-2-hydroxypropane;
1-(8-allyl-2-carboxychromon-7-yloxy)-3-(2-carboxychromon-7-yloxy)-2-hydroxypropane;
1,3-bis(2-carboxy-8-methallylchromon-7-yloxy)-2-hydroxypropane; and
1,3-bis(8-allyl-6-bromo-2-carboxychromon-7-yloxy)-2-hydroxy-propane.

Functional derivatives of the bis-chromonyl compounds include salts, esters and amides of one or more of the carboxylic acid functions present and esters of any hydroxylic functions present; salts being preferred for the compositions according to the invention.

Salts of the bis-chromonyl compounds which may be mentioned are salts with physiologically acceptable cations, for example, ammonium salts, metal salts such as alkali metal salts (e.g. sodium, potassium and lithium salts) and alkaline earth metal salts (e.g. magnesium and calcium salts) and salts with organic bases, e.g. amine salts such as piperidine, triethanolamine and diethylaminoethylamine salts.

Esters which may be mentioned include simple alkyl esters (e.g. methyl, ethyl, propyl, isopropyl, butyl esters etc.) and amides which may be mentioned include simple amides (for example amides with ammonia and lower alkyl amines such as methylamine, ethylamine, propylamine etc.) and more complex amides with amino acids such as glycine.

Any bronchodilator may be used in the novel compositions according to the invention. Examples of bronchodilators are isoprenaline, adrenaline, orciprenaline, isoetharine and derivatives thereof; isoprenaline sulphate being preferred.

The bronchodilator is suitably used in less amount than the bis-(chromone-2-carboxylic acid); e.g. in an amount of from 0.1–10 percent by weight of the bis-(chromone-2-carboxylic acid).

The bis-chromonyl compounds are of value in the prophylactic treatment of "extrinsic" allergic asthma and in the prophylactic treatment of so-called "intrinsic" asthma (in which no sensitivity to extrinsic antigen can be demonstrated).

It has been found that the therapeutic activity of the bis-chromonyl compounds is enhanced when they are administered by inhalation in association with a bronchodilator; i.e. it has been found that the two components of the composition exhibit a synergistic effect.

The compositions according to the invention are of particular value in the prophylactic treatment of asthma (allergic airway obstruction) and are intended for administration by inhalation.

The compositions will generally also contain a pharmaceutical carrier or diluent. Thus the compositions may comprise a suspension or solution of the active ingredients in water for administration by means of a conventional nebulizer. Alternatively the compositions may comprise a suspension or solution of the active ingredients in a liquified propellant (e.g. dichlorodifluoromethane or chlorotrifluoroethane) to be administered from a pressurized container. The compositions may also comprise the solid active ingredients diluted with a solid diluent, e.g. lactose, for administration from a powder inhalation device.

The compositions according to the invention also containing a pharmaceutical carrier or diluent will generally contain a major proportion of carrier or diluent and a minor proportion of active ingredients. Thus, for example, an aqueous solution for administration by means of a conventional nebulizer may comprise a 0.5 percent solution of the bis-chromonyl compound in sterile water and a solution or suspension in a pressurized propellant may contain about 2 percent of bis-chromonyl compound. However, where the composition comprises solid active ingredient diluted with a solid diluent such as lactose the diluent may be present in less, equal or greater amount than the active ingredients, for example, the solid diluent may be present in an amount of from about 50 percent to about 150 percent by weight of the bis-chromonyl compound.

Compositions according to the invention, in the form of suspensions in a liquified propellant will generally also contain a suspending agent, e.g. an anionic surface active agent such as an alkali metal salt of a dialkyl sulphosuccinate, e.g. sodium dioctyl sulphosuccinate or an alkali metal salt of an alkyl benzene sulphonate, e.g. sodium dodecyl benzene sulphonate.

The invention also comprises within its scope a method of relieving asthma which comprises administering to the patient, by inhalation, a therapeutic amount of a composition according to the invention, e.g. a sufficient amount of composition to afford a dose of 1–50 mg. of bis-chromonyl compound.

In order that the invention may be well understood, the following examples, of compositions according to the invention, are given by way of illustration only.

EXAMPLE 1

Aerosol formulation

| | |
|---|---|
| 1,3-bis(2-carboxychromon-5-yloxy)-2-hydroxy propane, disodium salt (Compound A) | 2.0% |
| Isoprenaline sulphate | 0.1% |
| Sodium dioctyl sulphosuccinate | 0.004% |
| Mixture of propellant 12 and propellant 14 (60:40 mixture) | ad. 100% |

EXAMPLE 2

Solid Powder formulation

Each dosage unit contains:
| | |
|---|---|
| Compound A | 20 mg. |
| Isoprenaline sulphate | 0.1 mg. |
| Lactose | 15 mg. |

What I claim is:

1. A pharmaceutical composition which comprises a bronchodilator and a member selected from the group consisting of 1,3-bis(2-carboxychromon-5-yloxy)-2-hydroxypropane, a therapeutically acceptable salt thereof, a $C_1$ to $C_4$ alkyl ester thereof and an amide thereof with ammonia or lower alkyl amines, wherein the bronchodilator is present in an amount of 0.1 to 10 percent by weight of the said bis-chromonyl compound.

2. The composition of claim 1 wherein the bis-chromonyl compound is in the form of a salt.

3. The composition of claim 1 wherein the bis-chromonyl compound is in the form of an alkali metal salt.

4. The composition of claim 1 wherein the bis-chromonyl compound is in the form of an alkaline earth metal salt.

5. The composition of claim 1 wherein the bis-chromonyl compound is in the form of an amide.

6. The composition of claim 1 wherein the bronchodilator is isoprenaline sulfate.

7. The composition of claim 1 comprising a solution of the active ingredients in water.

8. The composition of claim 1 further comprising a pharmaceutically acceptable solid diluent.

9. The composition of claim 1 wherein the bronchodilator is selected from the group consisting of isoprenaline, adrenaline, orciprenaline, isoetharine and pharmaceutically acceptable salts thereof.

10. The composition of claim 1, additionally containing a pharmaceutical carrier which is suitable for inhalation.

11. The composition of claim 1, in the form of an aerosol formulation.

12. A method for the relief of asthma which comprises administering to a patient, by inhalation, a composition according to claim 1, the amount of said composition administered, per dose, being sufficient to afford from 1 to about 50 milligrams of the bis-chromonyl compound.

13. The method of claim 12 wherein the bronchodilator is selected from the group consisting of isoprenaline, adrenaline, orciprenaline, isoetharine and pharmaceutically acceptable salts thereof.

14. The composition of claim 11 wherein the bronchodilator is isoprenaline sulfate.

* * * * *